(12) United States Patent
Winckler et al.

(10) Patent No.: US 12,522,078 B2
(45) Date of Patent: Jan. 13, 2026

(54) DEPLOYABLE POWER RAIL CONNECTOR FOR ELECTRIC MACHINE AND METHOD

(71) Applicant: Caterpillar Inc., Peoria, IL (US)

(72) Inventors: Kurt L. Winckler, Tucson, AZ (US); Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 678 days.

(21) Appl. No.: 17/984,508

(22) Filed: Nov. 10, 2022

(65) Prior Publication Data

US 2024/0157802 A1 May 16, 2024

(51) Int. Cl.
*B60L 5/38* (2006.01)

(52) U.S. Cl.
CPC .............. *B60L 5/38* (2013.01); *B60L 2200/40* (2013.01)

(58) Field of Classification Search
CPC ...... B60L 5/00; B60L 5/08; B60L 5/12; B60L 5/16; B60L 5/19; B60L 5/22; B60L 5/24; B60L 5/28; B60L 5/38; B60L 5/39; B60L 5/40; B60L 50/53; B60L 2200/36; B60L 2200/40
USPC .......................... 191/45 R, 22, 50, 53, 49, 66
See application file for complete search history.

(56) References Cited

U.S. PATENT DOCUMENTS

| | | | |
|---|---|---|---|
| 5,992,534 A | 11/1999 | Callies et al. | |
| 6,257,343 B1 | 7/2001 | Maenle et al. | |
| 8,577,530 B2 | 11/2013 | Ruth et al. | |
| 8,893,830 B2 | 11/2014 | Ruth | |
| 9,403,526 B2 | 8/2016 | Saito et al. | |
| 10,894,468 B2 | 1/2021 | Nakamura et al. | |
| 11,163,313 B2 | 11/2021 | Ohman | |
| 2003/0159900 A1 | 8/2003 | Wilpsbaumer | |
| 2015/0321563 A1 | 11/2015 | Buehs et al. | |
| 2017/0328385 A1 | 11/2017 | Baur | |
| 2019/0105989 A1* | 4/2019 | Pachler | B60L 5/30 |
| 2021/0122284 A1 | 4/2021 | Miller et al. | |

FOREIGN PATENT DOCUMENTS

WO 2021173988 A1 9/2021

OTHER PUBLICATIONS

Written Opinion and International Search Report for Int'l. Patent Appln. No. PCT/US2023/077359, mailed Feb. 13, 2024 (9 pgs).

* cited by examiner

Primary Examiner — S. Joseph Morano
Assistant Examiner — Heaven R Buffington
(74) Attorney, Agent, or Firm — Brannon Sowers & Cracraft

(57) ABSTRACT

A power rail connector for an electric power system in an electric machine includes a linkage having a lower link and an upper link, and a rail contactor coupled to the lower link and including electrical contacts positioned to electrically connect to a power rail. The linkage includes a fold joint, a lift joint, and a pivot, and is adjustable from an extended, current-collecting configuration to a collapsed configuration via rotation of the lower link relative to the upper link and rotation of the upper link relative to the pivot. Related machinery and methodology is also disclosed.

19 Claims, 4 Drawing Sheets

DEPLOYABLE POWER RAIL CONNECTOR FOR ELECTRIC MACHINE AND METHOD

TECHNICAL FIELD

The present disclosure relates generally to supplying electrical power to an electric machine, and more particularly to a power rail connector adjustable from an extended, current-collecting configuration to a collapsed configuration to selectively electrically connect to an external power rail.

BACKGROUND

Large-scale mining of materials from the earth is an energy-intensive endeavor. In many mines, notably opencast mines, a fleet of large mining trucks may operate almost continuously to transport ore and overburden from an extraction area to a dump or processing location. Such mining trucks are commonly operated by way of diesel-powered engines. Both direct-drive diesel engines and diesel-electric systems have been in use for decades. Fuel costs for mining trucks can be substantial. Many mines, moreover, are located in remote areas, and the costs of transporting fuel to a mine site can significantly increase operational expenses. In some instances, fuel supply itself can be challenging and/or unpredictable regardless of fuel costs. Engineers in the mining industry and manufacturers of equipment are continually searching for ways to mitigate price volatility, and to reduce fuel consumption and expenditures generally.

Mine operators have implemented a variety of different technologies in an effort to improve predictability of costs and reduce costs overall. Electric power generation may take place on-site at a mine, but can have similar cost and availability concerns relating to fueling equipment directly using petroleum fuels. Electrical power supplied from a grid can also be susceptible to interruptions and price volatility. Even where full electric powering of mining equipment is viable, there is considerable motivation to use electric power as efficiently as possible.

In recent years fully electric mining machinery has been proposed. In an effort to further distance mining operations from fossil fuels, electric power is supplied at certain mine sites by way of a so-called trolley system having an overhead trolley line to provide electric power for operating mining trucks, particularly when traveling loaded upon uphill grades. Mining trucks used at such sites may need to travel an uphill grade on the haul road that is several kilometers long, or more.

Mining trucks configured to run on-trolley have seen commercial success. An overhead trolley line, however, can be expensive to install and maintain. Moreover, providing a mechanism that can reach upwardly and/or outwardly from a mining truck to electrically contact an overhead trolley line can be costly and complex. One example of a mining truck configured to collect electrical power from an overhead trolley line is known from U.S. Pat. No. 8,893,830B2 to Ruth. The art provides ample opportunity for improvements and development of alternative strategies relating to supplying electric power to electric machinery.

SUMMARY

In one aspect, a power rail connector for an electric power system in a machine includes a linkage having a lower link, an upper link, a fold joint connecting the lower link to the upper link, a fold actuator coupled between the upper link and the lower link, a pivot, a lift joint connecting the pivot to the upper link, and a lift actuator coupled between the pivot and the upper link. The power rail connector further includes a rail contactor coupled to the lower link and including electrical contacts positioned to electrically connect to a power rail. The fold joint defines a horizontally extending fold axis, the lift joint defines a horizontally extending lift axis, and the pivot defines a vertically extending pivot axis. The linkage is adjustable from an extended, current-collecting configuration to a collapsed configuration via rotation of the lower link relative to the upper link about the fold axis and rotation of the upper link relative to the pivot about the lift axis.

In another aspect, an electric machine includes a frame having a front frame end and a back frame end, and ground-engaging propulsion elements coupled to the frame. The electric machine further includes an electric power system having an electric motor, and a power rail connector including a support arm having an inboard arm end coupled to the frame, and an outboard arm end, and a linkage supported on the outboard arm end. The linkage includes a lower link, an upper link, a fold joint connecting the lower link to the upper link and defining a fold axis, a pivot defining a pivot axis, a lift joint connecting the pivot to the upper link and defining a lift axis, and a rail contactor coupled to the lower link. The support arm is movable from a stowed position relative to the frame, to a service position at which the outboard arm end is faced laterally outward of the frame. The linkage is adjustable from an extended, current-collecting configuration to a collapsed configuration via rotation of the lower link relative to the upper link about the fold axis and rotation of the upper link relative to the pivot about the lift axis.

In still another aspect, a method of operating a machine includes moving a support arm coupled to a frame in a machine from a stowed position to a service position extending onboard from the frame, and adjusting a linkage of a power rail connector from a collapsed configuration to an extended, current-collecting configuration via unfolding the linkage at a fold joint, and lowering the linkage at a lift joint. The method further includes aligning a rail contactor laterally with a power rail, based on an at least one of an angular orientation of the linkage relative to the support arm or a lateral position of the support arm relative to the frame, and contacting the rail contactor to the power rail to electrically connect an electric power system of the machine to the power rail.

DETAILED DESCRIPTION

Figure 1:
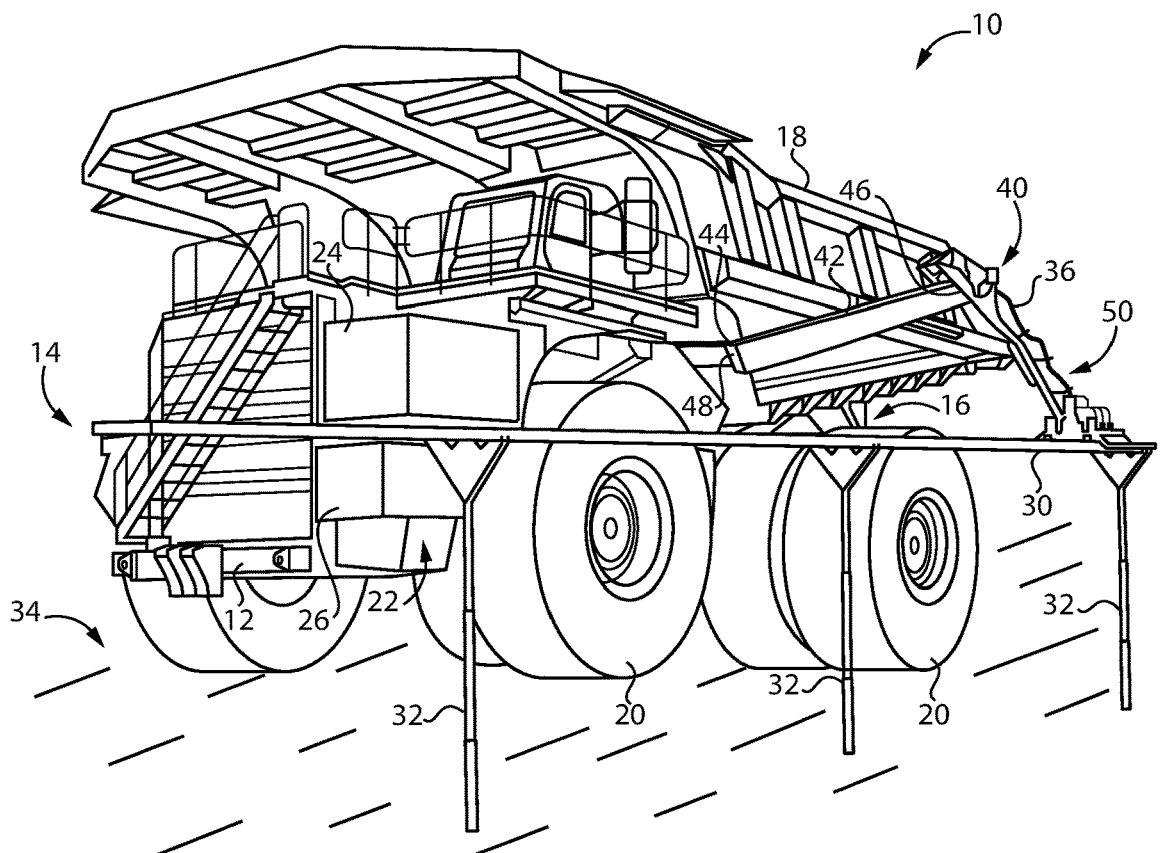
FIG. 1 is a diagrammatic view of an electric machine, according to one embodiment.

Referring to FIG. 1. there is shown an electric machine 10, according to one embodiment. Machine 10 includes a frame 12 having a front frame end 14 and a back frame end 16. A bed 18 is supported on frame 12 and typically movable between a lowered or loading position and a raised or dumping position as is conventionally known. Ground-engaging elements 20 are coupled to frame 12 and include wheels in the illustrated embodiment. Machine 10 is shown in the context of a mining truck as is well-known and used for transporting ore and overburden in an opencast mine environment. The present disclosure is not thereby limited, however, and other types of machines are within the scope of the present disclosure, including track-type machines, loader machines, motor graders, scrapers, or still others.

Machine 10 includes an electric power system 22 having an electric motor 24 and a battery 26. In an embodiment, electric motor 24 includes an electric drive motor structured to rotate ground-engaging elements 20 for propelling and maneuvering machine 10. Embodiments are contemplated where a single electric drive motor is provided that powers some or all of ground-engaging elements 20, as well as embodiments where individual wheel electric motors are used. In still other instances machine 10 could include both a combustion engine and an electric drive motor or multiple electric drive motors, or potentially even a combustion engine for propulsion and electric motors for operating on-board equipment such as pumps, fans, compressors, and other equipment. In a practical implementation machine 10 is 100% electrically powered. While one electrical energy storage device, namely, battery 26, is shown, in many embodiments multiple batteries or multiple battery banks may be carried on-board. As an alternative to or in addition to electric batteries, embodiments are contemplated employing electrical energy storage devices in the nature of capacitors. It will thus be appreciated that machine 10 is described as an electric machine without limitation as to the purpose or extent of electrification of the various machine components.

Machine 10 is shown upon a work surface or substrate 34. Positioned adjacent to machine 10 in FIG. 1 is a power rail 30 including a plurality of parallel conductive lines or bars, at least some of which are electrified by way of electric grid power, on-site electric power generation or storage, et cetera. It is contemplated that, at least at times during operation in service, it is desirable to supply electric power to machine 10 from power rail 30 for directly powering electric power system 22 or for charging the one or more batteries 26. To this end, machine 10 may electrically connect to power rail 30 only at certain times during service such as where battery 26 needs to be charged or where it is otherwise desirable to electrically connect electric power system 22 to off-board electric power. One example of the latter scenario is when machine 10 is climbing a haul road and moving upon substrate 34 up a grade out of a mine while loaded with ore, overburden, et cetera. In other instances electric power system 22 may be connected to power rail 30 where machine 10 is traversing a relatively level and straight segment of a travel path between a loading location and a dumping location. The timing, location, duration, and frequency of connections to power rail 30 will depend upon various factors including how machine 10 is used and the design of a mine as well as design of the off-board electrical power system of which power rail 30 is a part. Power rail 30 is shown supported upon stands or the like 32 above substrate 34. In other instances power rail 30 could be supported upon or close to substrate 34, supported by way of horizontal supports, or still another configuration.

To electrically connect electric power system 22 to power rail 30 machine 10 includes a power rail connector 40. Power rail connector 40 is positionable according to multiple degrees of freedom laterally of frame 12 to provide electrical connection between power rail 30 and electric power system 22 at a range of power rail heights, locations relative to machine 10, and to accommodate changes in height, curves, and other variations in location of power rail 30 relative to machine 10. Power rail connector 40 may include electrical cabling 36 that provides electrical power connections between power rail 30 and electric power system 22. Suitable power electronics may be carried onboard machine 10 for purposes of power conditioning and distribution between and among electric motor 24, battery 26, and other electric power system components.

Figure 2:
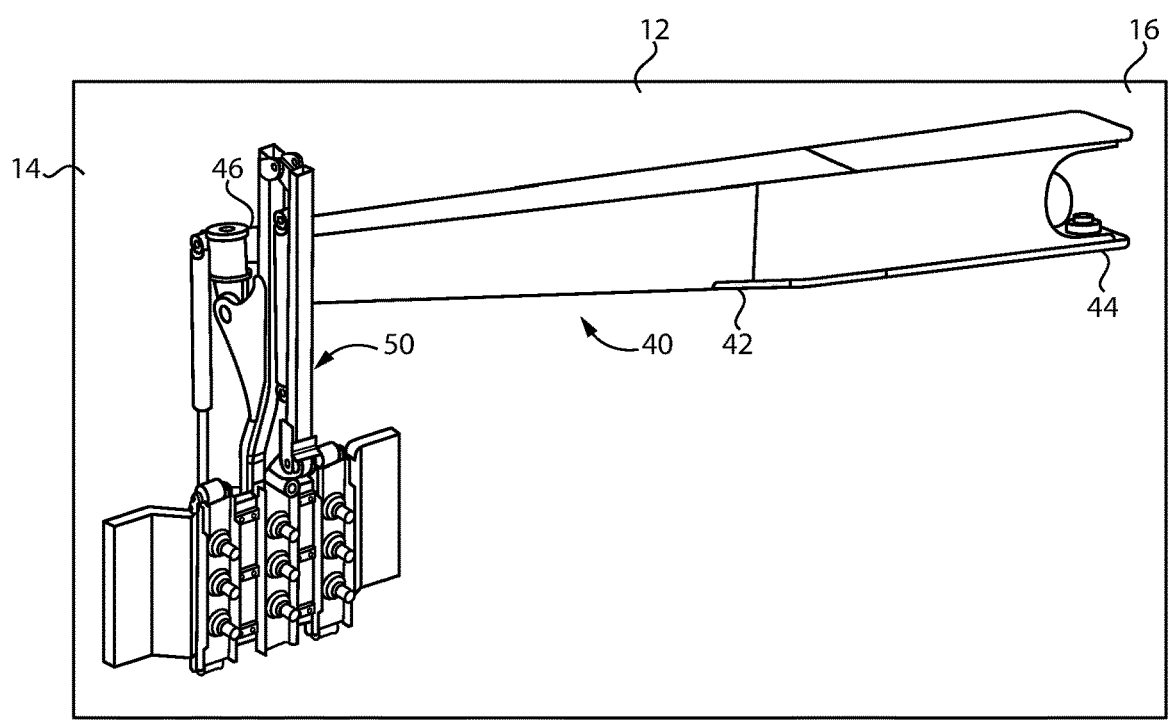
FIG. 2 is a diagrammatic view of a power rail connector in a collapsed configuration, according to one embodiment.
Figure 3:
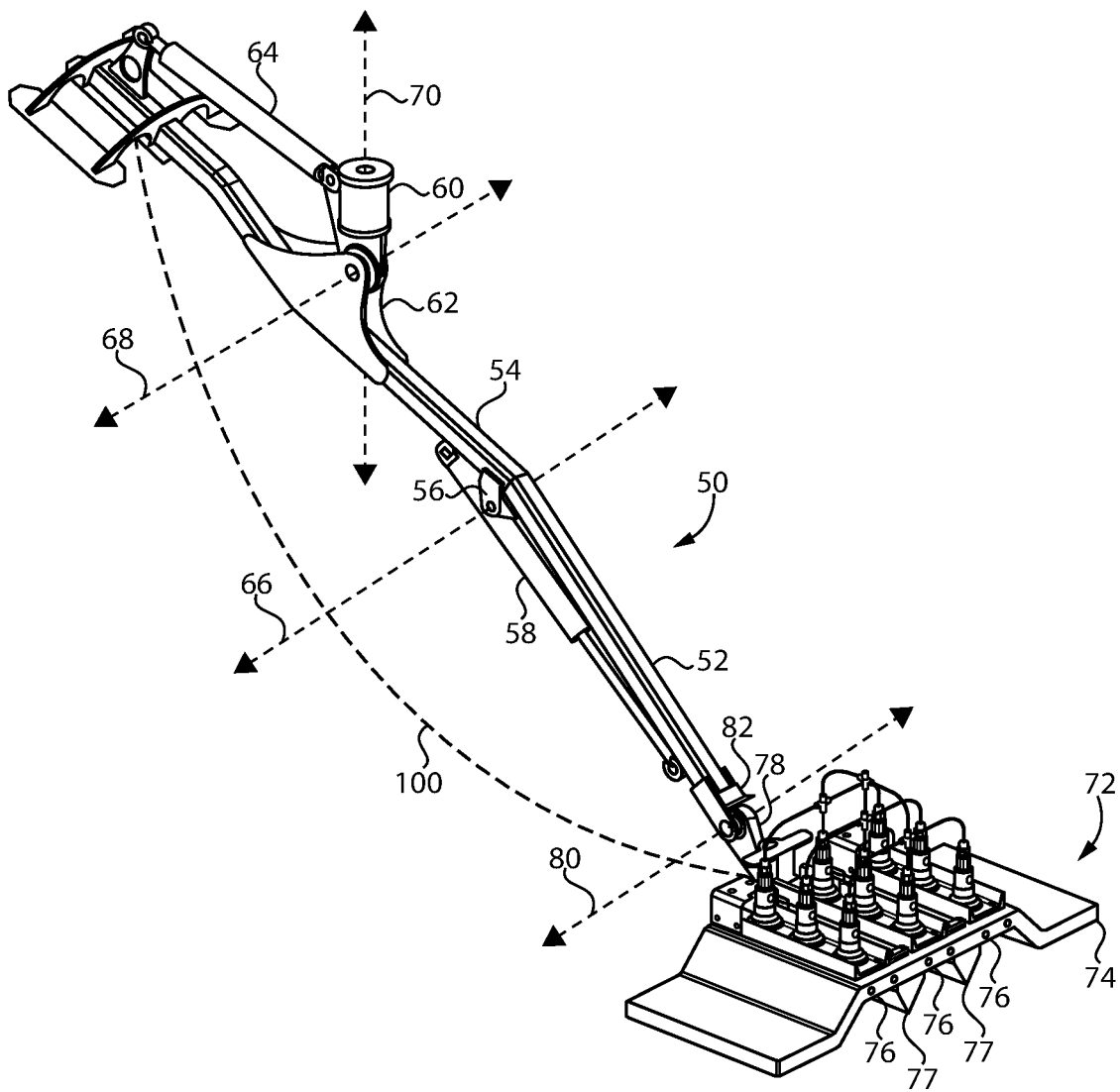
FIG. 3 is a diagrammatic view of a power rail connector in an extended, current-collecting configuration, according to one embodiment.

Referring also now to FIGS. 2 and 3, power rail connector 40 includes a linkage 50 having a lower link 52, an upper link 54, and a fold joint 56 connecting lower link 52 to upper link 54. Linkage 50 also includes a fold actuator 58 coupled between upper link 54 and lower link 52, a pivot 60, a lift joint 62 connecting pivot 60 to upper link 54, and a lift actuator 64 coupled between pivot 60 and upper link 54. Power rail connector 40 may also include a horizontally extending support arm 42. Support arm 42 includes an inboard arm end 44 coupled to frame 12, and an outboard arm end 46. Support arm 42 may be movable from a stowed position relative to frame 12, to a service position approximately as shown in FIG. 1 where outboard arm end 46 is spaced laterally outward of frame 12. A pivot 48 may connect inboard arm end 44 to frame 12 or other supporting components. In an embodiment, support arm 42 can function as a swing arm, swinging out about pivot 48 to the service position as depicted in FIG. 1, and swinging in about pivot 48 to the stowed position approximately as depicted in FIG. 2. Support arm 42 may be coupled with a suitable actuator, such as a hydraulic cylinder, to swing between the stowed position and the service position. Support arm 42 may be pivotable between the stowed position and the extended position, and in alignment fore-aft with frame 12 at the stowed position. Support arm 42 may also be vertically movable, up and down in the FIG. 1 illustration, in some embodiments. In still other implementations support arm 42 could be telescoping or swing vertically, or movable relative to frame 12 by way of any other suitable strategy or mechanism.

With continued focus on FIG. 3, power rail connector 40 may further include a rail contactor 72 coupled to lower link 52 and including electrical contacts 76 positioned to electrically connect to power rail 30. Rail contactor 72 may include any suitable number of electrical contacts, and as illustrated includes three elongate electrical contacts 76. Electrical contacts 76 may include elongate brushes, for example, extending parallel to one another as in the illustrated embodiment and alternating with a plurality of spacers 77. Any suitable electrical contact configuration and/or material may be used. Rail contactor 72 may be movable in at least 1 degree of freedom relative to lower link 52 and attached to lower link 52 by way of a lower pivot 78. Lower pivot 78 defines a pivot axis 80 that is horizontally extending and enables rail contactor 72 to pivot up and down. In an implementation, a neutral support 82 is coupled to lower pivot 78 and causes rail contactor 72 to generally maintain a fixed orientation relative to lower link 52 unless perturbed. In this manner, during engagement of rail contactor 72 with power rail 30, rail contactor 72 can be expected to seat against power rail 30 with the assistance of its own weight. Rail contactor 72 may include a hat or body 74 supporting electrical contacts 76.

Figure 4:
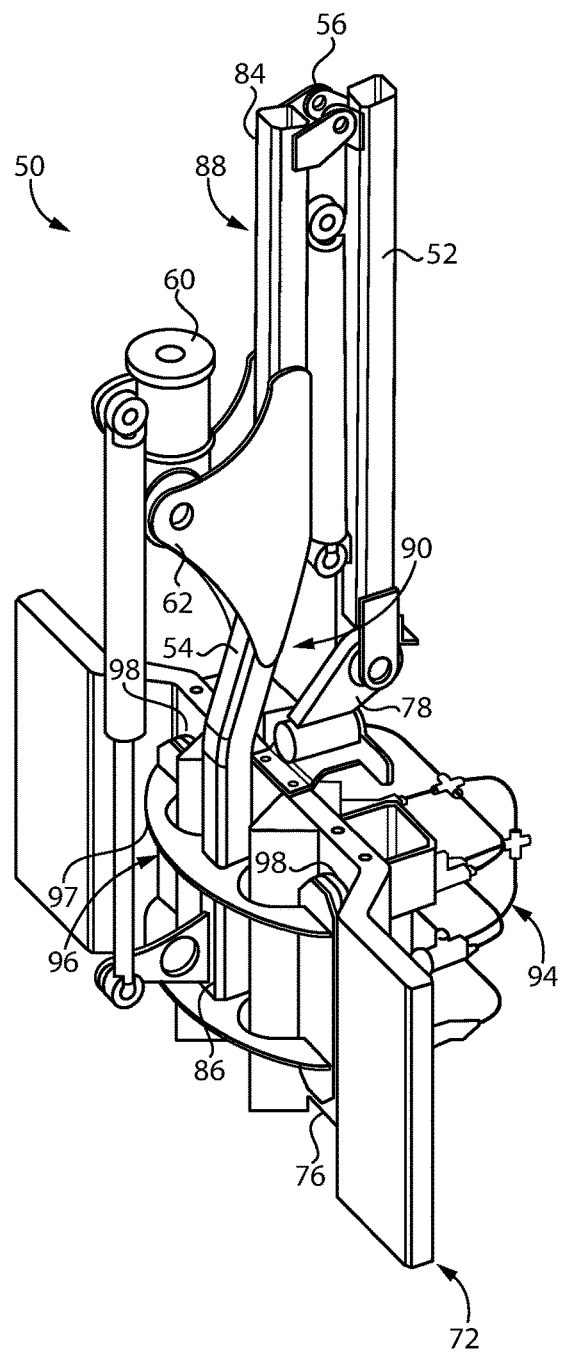
FIG. 4 is another diagrammatic view of a power rail connector in a collapsed configuration, according to one embodiment.
Figure 5:
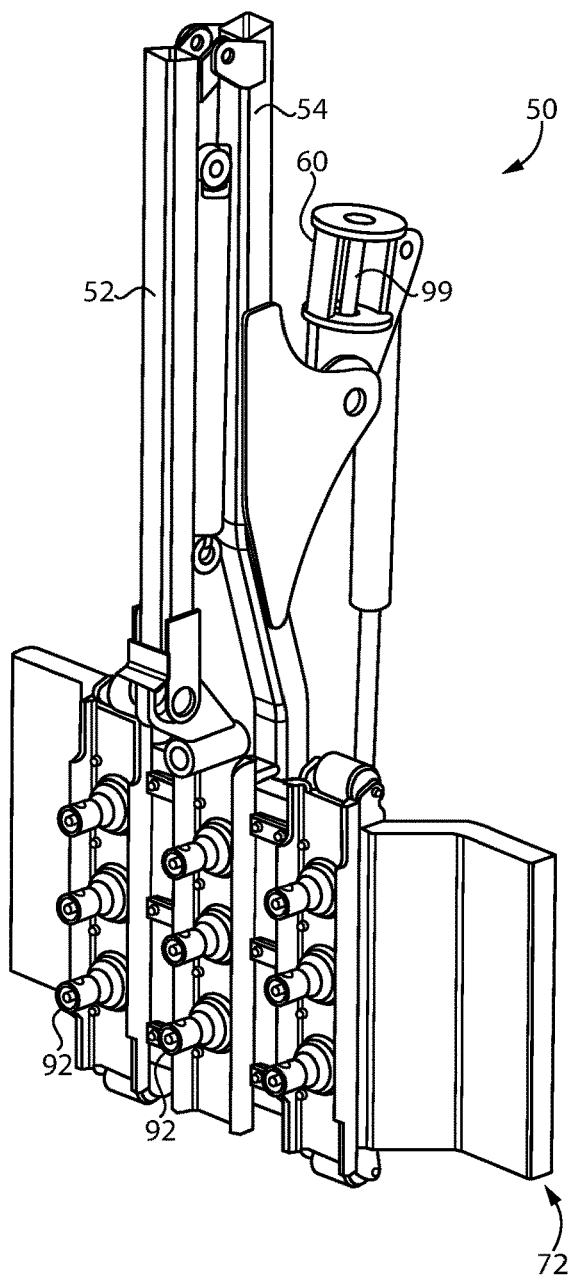
FIG. 5 is another diagrammatic view rotated approximately 180° relative to FIG. 4, of a power rail connector as in FIG. 4.

Fold joint 56 defines a horizontally extending fold axis 66. Lift joint 62 defines a horizontally extending lift axis 68. Pivot 60 defines a vertically extending pivot axis 70. Linkage 50 may be adjustable from an extended, current-collecting configuration approximately as shown in FIGS. 1 and 3 to a collapsed configuration approximately as shown in FIGS. 2, 4, and 5, via rotation of lower link 52 relative to upper link 54 about fold axis 66 and rotation of upper link 54 relative to pivot 60 about lift axis 68. In view of the foregoing description, it will be appreciated that power rail connector 40 can be extended by way of moving support arm 42 and deploying linkage 50 to a configuration outboard of frame 12 and electrically contacting power rail 30, and to the collapsed configuration where linkage 50 is retracted for storage and support arm 42 swung back against frame 12. This functionality enables power rail connector 40 to be selectively positioned at a range of locations and orientations relative to frame 12 to successfully electrically connect with power rail 30 in a range of conditions.

Referring also now to FIGS. 4 and 5, upper link 54 includes a first upper link end 84 attached to fold joint 56, and a second upper link end 86. Lift joint 62 may be attached to upper link 54 at a location between first upper link end 84 and second upper link end 86. Lift actuator 64 may include a linear actuator, such as a hydraulic cylinder, coupled between pivot 60 and second upper link end 86. In an implementation lift actuator 64 is directly attached to pivot 60 and directly attached to second upper link end 86, such as by flanged connections. Fold actuator 58 may also include a linear actuator, such as a hydraulic cylinder, coupled between lower link 52 and upper link 54, and typically attached to the respective upper link 54 and lower link 52 by way of flanged connections. It can further be noted that pivot 60 is located on an upper side 88 of upper link 54. Upper link 54 also includes a lower side 90. Power rail connector 40 may also include a dock 96 mounted to second upper link end 86 and including a plurality of pads 98 located on lower side 90. In the illustrated embodiment dock 96 includes a frame 97 that positions pads 98 to contact rail contactor 72 in the collapsed configuration. Pads 98 may contact rail contactor 72 in an alternating arrangement with the plurality of elongate electrical contacts 76.

Returning to focus on FIG. 3, an arc 100 is defined between dock 96 and rail contactor 72 in the extended, current-collecting configuration. Fold axis 66 may define a vertex of an angle subtended by arc 100. The angle subtended by arc 100 may have a size ranging from about 0° in the collapsed configuration to about 180° in the extended, current-collecting configuration. As used herein, the term "about" can be understood to mean generally or approximately, as would be understood by one of skill in the art, such as within measurement error. It can also be appreciated that rotation of lower link 52 relative to upper link 54 and rotation of upper link 54 relative to pivot 60 may both be a counterclockwise rotation. Thus, in the view of FIG. 3 lower link 52 is understood to rotate counterclockwise about fold axis 56 and upper link 54 understood to rotate counterclockwise about lift axis 68 when linkage 50 is adjusted from the extended, current-collecting configuration to the collapsed configuration.

Focusing now briefly on FIG. 5, there can be seen electrical connectors 92 that electrically connect to electrical contacts 76. Wiring 94 as shown in FIG. 4 can electrically connect electrical contacts 76 to cabling 36. Also shown in FIG. 5 is a pivot pin 99 within pivot 60. Pivot pin 99 or another suitable rotatable structure may be positioned within pivot 60 and attached to horizontally extending support arm 42 enabling linkage 50 to pivot in a range of angular orientations relative to support arm 42.

INDUSTRIAL APPLICABILITY

Figure 6:
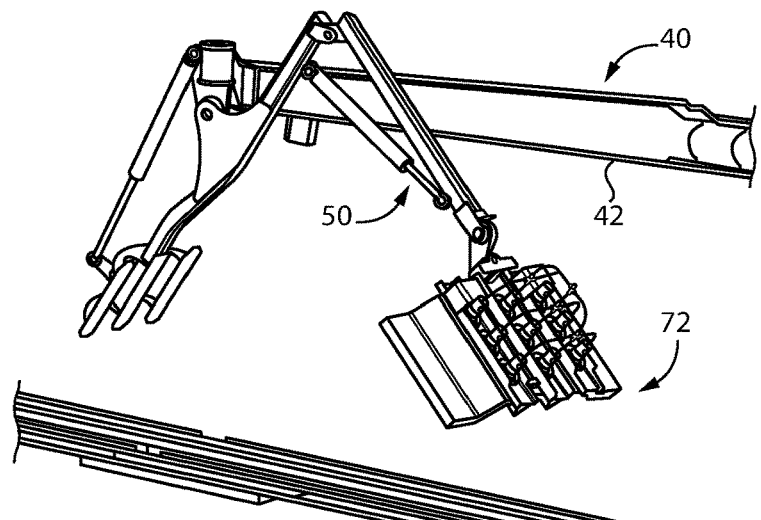
FIG. 6 is a diagrammatic view of a power rail connector at one stage of deployment, according to one embodiment.
Figure 7:
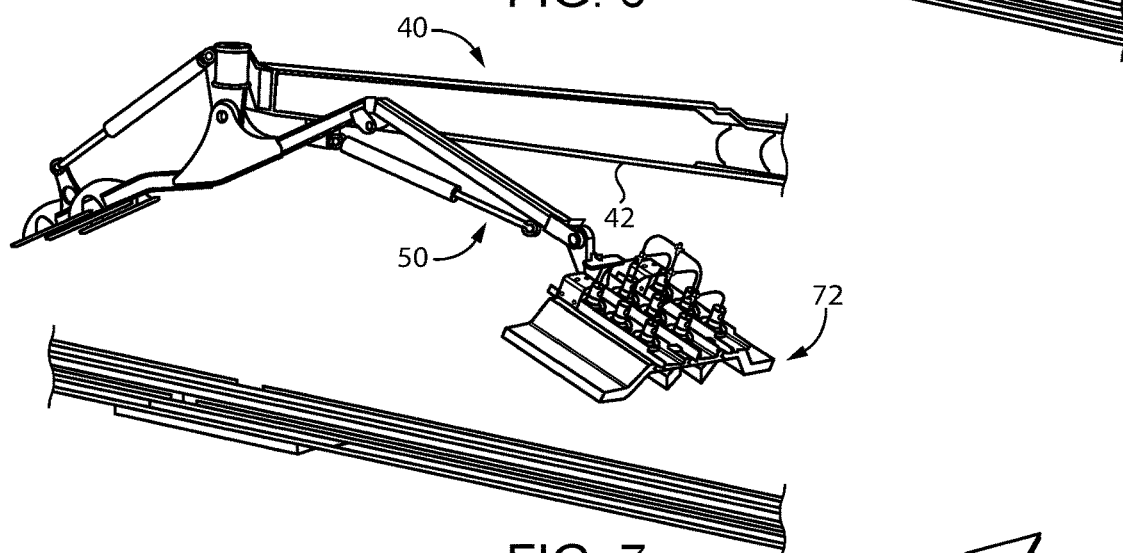
FIG. 7 is a diagrammatic view of a power rail connector at another stage of deployment, according to one embodiment.
Figure 8:
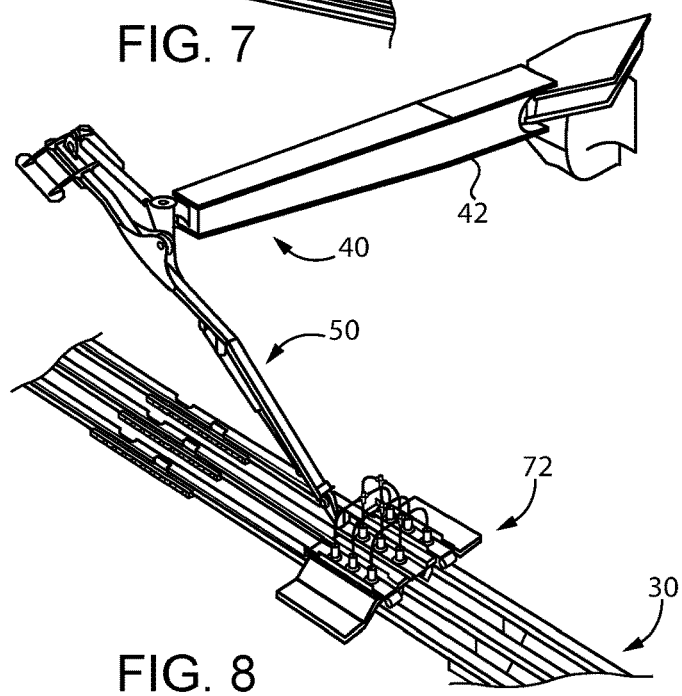
FIG. 8 is a diagrammatic view of a power rail connector at yet another stage of deployment electrically contacting a power rail, according to one embodiment.

Referring to the drawings generally, but also now focusing on FIGS. 6, 7, and 8, when machine 10 is moved in proximity to power rail 30, typically moving generally parallel along power rail 30, and it is desirable to initiate connecting electric power system 22 to power rail 30, support arm 42 may be moved from a stowed position toward a service position extending outboard from frame 12. With support arm 42 appropriately positioned, or during the positioning of support arm 42, linkage 50 may be adjusted from a collapsed configuration to the extended, current-collecting configuration via unfolding linkage 50 at fold joint 56, and lowering linkage 50 at lift joint 62. Rail contactor 72 may be aligned laterally with power rail 30, based on an at least one of an angular orientation of linkage 50 about pivot axis 70 relative to support arm 42 or a lateral position of support arm 42 relative to frame 12. It will thus be appreciated that support arm 42 can be positioned at a range of locations and orientations relative to frame 12, and linkage 50 can be positioned at a range of angular orientations about pivot axis 70 to position rail contactor 72 above power rail 30. Linkage 50 may be fully extended and lowered to contact rail contactor 72 to power rail 30 to electrically connect electric power system 22 in machine 10 to power rail 30. While connected to power rail 30, a weight of linkage 50 may be supported by the attachment of pivot 60 to support arm 42 and by resting upon power rail 30 itself.

As discussed above, adjusting linkage 50 in this manner may occur during moving machine 10 along power rail 30. Stopping machine 10 to achieve the desired electrical connection would nevertheless be within the scope of the present disclosure. With rail contactor 72 electrically connected to power rail 30 machine 10 can operate with electric power supplied via power rail 30, directly powering onboard electrical equipment such as electric motor 24, charging battery 26, or both. When it is desirable to end electrical connection to power rail 30, such as where machine 10 reaches an end of power rail 30 near the end of an uphill grade, where battery 26 is fully charged, or for other reasons such as maneuvering machine 10 away from power rail 30, linkage 50 can be adjusted back to the collapsed configuration, contacting rail contactor 72 to dock 96 in the collapsed configuration. Support arm 42 can be rotated back to the stowed position, and machine operation continue using on-board electrical power.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A power rail connector for an electric power system in a machine comprising:
a linkage including a lower link, an upper link, a fold joint connecting the lower link to the upper link, a fold actuator coupled between the upper link and the lower link, a pivot, a lift joint connecting the pivot to the upper link, and a lift actuator coupled between the pivot and the upper link;
a rail contactor coupled to the lower link and including electrical contacts positioned to electrically connect to a power rail;
the fold joint defining a horizontally extending fold axis, the lift joint defining a horizontally extending lift axis, and the pivot defining a vertically extending pivot axis; and
the linkage is adjustable from an extended, current-collecting configuration to a collapsed configuration via rotation of the lower link relative to the upper link about the fold axis and rotation of the upper link relative to the pivot about the lift axis.

2. The power rail connector of claim 1 wherein the upper link includes a first upper link end attached to the fold joint, and a second upper link end, and the lift joint is attached to the upper link at a location between the first upper link end and the second upper link end.

3. The power rail connector of claim 2 wherein the lift actuator includes a linear actuator coupled between the pivot and the second upper link end.

4. The power rail connector of claim 1 wherein the pivot is located on an upper side of the upper link.

5. The power rail connector of claim 4 further comprising a dock mounted to the second upper link end and including a plurality of pads located on a lower side of the upper link.

6. The power rail connector of claim 5 wherein an arc is defined between the dock and the rail contactor assembly in the extended, current-collecting configuration, and the fold axis defines a vertex of an angle subtended by the arc.

7. The power rail connector of claim 6 wherein the angle has a size ranging from about 0° in the stowed configuration to about 180° in the extended, current-collecting configuration.

8. The power rail connector of claim 5 wherein:
the rail contactor is pivotably coupled to the lower link;
the electrical contacts include a plurality of elongate electrical contacts arranged in parallel; and
the plurality of pads contact the rail contactor in an alternating arrangement with the plurality of elongate electrical contacts.

9. The power rail connector of claim 1 further comprising a horizontally extending support arm attached to the pivot, and the linkage is rotatable about the pivot axis relative to the horizontally extending support arm.

10. An electric machine comprising:
a frame having a front frame end and a back frame end;
ground-engaging propulsion elements coupled to the frame;
an electric power system including an electric motor, and a power rail connector including a support arm having an inboard arm end coupled to the frame, and an outboard arm end, and a linkage supported on the outboard arm end;
the linkage including a lower link, an upper link, a fold joint connecting the lower link to the upper link and defining a fold axis, a pivot defining a pivot axis, a lift joint connecting the pivot to the upper link and defining a lift axis, and a rail contactor coupled to the lower link;
the support arm is movable from a stowed position relative to the frame, to a service position at which the outboard arm end is spaced laterally outward of the frame; and
the linkage is adjustable from an extended, current-collecting configuration to a collapsed configuration via rotation of the lower link relative to the upper link about the fold axis and rotation of the upper link relative to the pivot about the lift axis.

11. The machine of claim 10 wherein the support arm is pivotable between the stowed position and the extended position, and is in alignment fore-aft with the frame at the stowed position.

12. The machine of claim 11 wherein the pivot is attached to the outboard arm end, and the lift joint is attached to the upper link at a location between a first upper link end attached to the fold joint, and a second upper link end.

13. The machine of claim 10 further comprising a dock mounted to the second upper link end, and wherein an arc is defined between the dock and the rail contactor in the extended, current-collecting configuration, and the fold axis defines a vertex of an angle subtended by the arc.

14. The machine of claim 10 further comprising a linear fold actuator coupled between the upper link and the lower link, and a linear lift actuator coupled between the pivot and the upper link.

15. The machine of claim 10 wherein the power rail connector further includes a dock mounted to the upper link and contacted by the rail contactor in the collapsed configuration.

16. A method of operating a machine comprising:
moving a support arm coupled to a frame in a machine from a stowed position to a service position extending outboard from the frame;
adjusting a linkage of a power rail connector from a collapsed configuration to an extended, current collecting configuration via unfolding the linkage at a fold joint, and lowering the linkage at a lift joint;
aligning a rail contactor laterally with a power rail, based on an at least one of an angular orientation of the linkage relative to the support arm or a lateral position of the support arm relative to the frame; and
contacting the rail contactor to the power rail to electrically connect an electric power system of the machine to the power rail.

17. The method of claim 16 wherein the adjusting the linkage occurs during moving the machine along the power rail, and further comprising trailing the power rail connector from the support arm during the contacting the rail contactor to the power rail.

18. The method of claim 16 further comprising supporting the linkage via a pivot attached to the linkage at a location between the rail contactor and a dock.

19. The method of claim 18 further comprising adjusting the linkage back to the collapsed configuration, and contacting the rail contactor to the dock in the collapsed configuration.

* * * * *